United States Patent
Jhang

(10) Patent No.: US 8,694,560 B2
(45) Date of Patent: Apr. 8, 2014

(54) SYSTEMS AND METHODS FOR TABLE DEFINITION LANGUAGE GENERATION

(75) Inventor: Hyoung Jhang, Johnscreek, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/191,391

(22) Filed: Jul. 26, 2011

(65) Prior Publication Data
US 2013/0031115 A1 Jan. 31, 2013

(51) Int. Cl.
*G06F 7/00* (2006.01)
*G06F 17/30* (2006.01)

(52) U.S. Cl.
USPC .......................................... 707/806

(58) Field of Classification Search
USPC .......................................... 707/806
See application file for complete search history.

(56) References Cited

U.S. PATENT DOCUMENTS

| 6,115,704 | A | 9/2000 | Olson et al. | |
| 6,199,068 | B1 * | 3/2001 | Carpenter | 1/1 |
| 2002/0198908 | A1 * | 12/2002 | Hartel | 707/513 |
| 2007/0088766 | A1 * | 4/2007 | Bodge et al. | 707/203 |
| 2009/0204782 | A1 | 8/2009 | Barbarek | |
| 2009/0222828 | A1 * | 9/2009 | Lefevre et al. | 718/102 |
| 2009/0224938 | A1 * | 9/2009 | Kopp et al. | 340/870.02 |

FOREIGN PATENT DOCUMENTS

WO 2006000033 A1 1/2006

OTHER PUBLICATIONS

Office Action issued in connection with NZ Application No. 601462, Jul. 31, 2012.

* cited by examiner

*Primary Examiner* — Mehesh Dwivedi
*Assistant Examiner* — Kris Mackes
(74) *Attorney, Agent, or Firm* — Fletcher Yoder, P.C.

(57) ABSTRACT

A non-transitory computer readable medium is provided that includes instructions to interpret a table definition language fragment, that includes modifications of attributes and functionalities defined in a first table definition language. The non-transitory computer readable medium also includes instructions to generate a second table definition language with the subsequent modifications based at least upon applying the modifications in the table definition language fragment to the first table definition language.

19 Claims, 3 Drawing Sheets

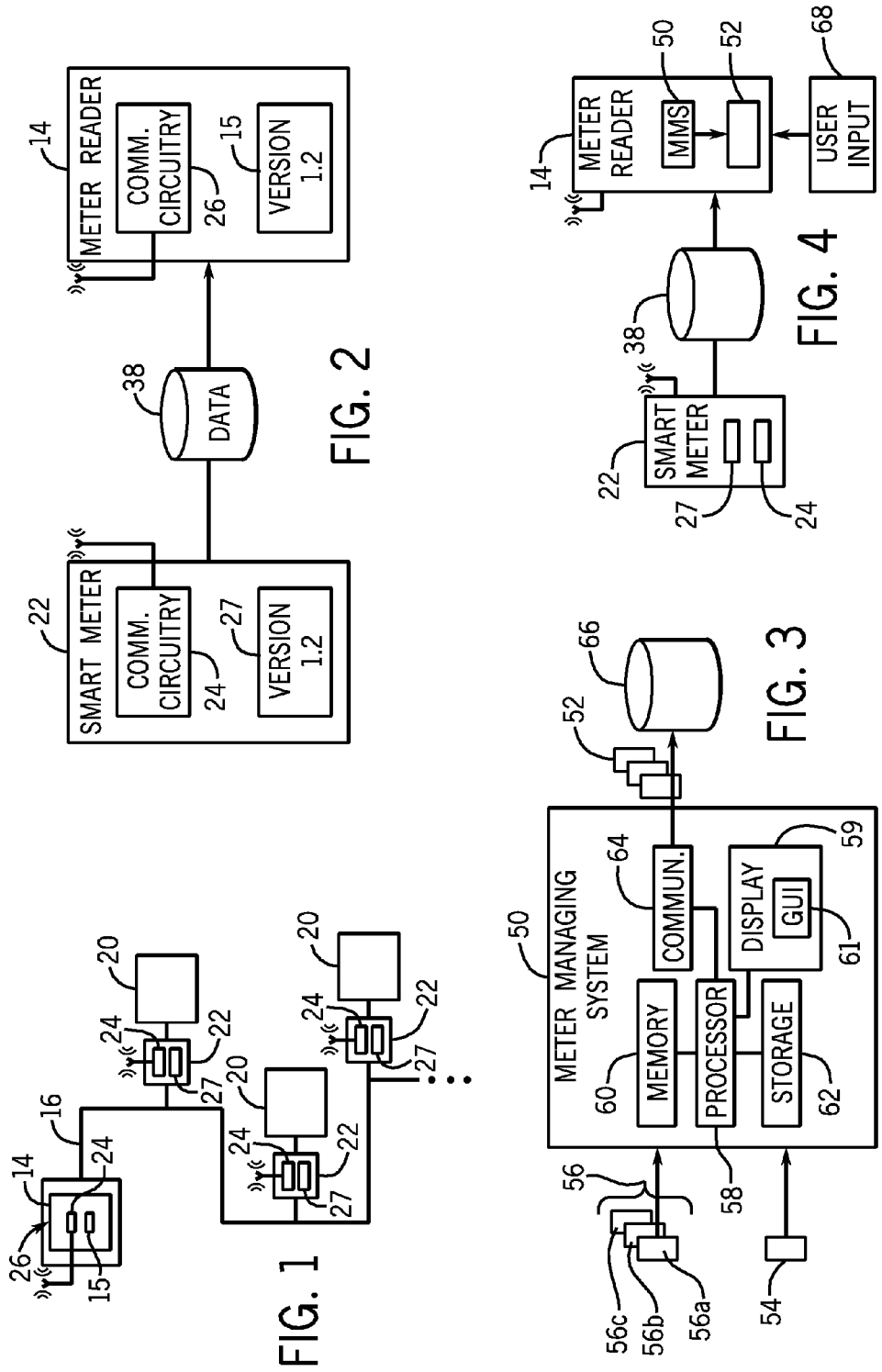

SYSTEMS AND METHODS FOR TABLE DEFINITION LANGUAGE GENERATION

BACKGROUND OF THE INVENTION

The subject matter disclosed herein relates to smart meters, and in particular, generating updated table definition language files for the smart meters.

Smart meters are electrical utility meters that may be able to record consumption of electric energy over intervals of time and communicate the recorded information back to the utility providing the electricity. The smart meters may include advanced functionality including the ability to understand when power was consumed, introduce advanced power pricing schemes based upon an amount of usage at specific times, etc. Further, the smart meters may provide energy consumers bill estimates, may help to manage use, and/or help reduce energy costs. Over the operational life of a smart meter, smart meter manufacturers may desire to make a number of modifications to the underlying software of the smart meter. For example, over time, a manufacturer may desire to modify the functionality of the smart meter, or may desire to add functionality to the smart meter. Such modification or addition to the functionality of the smart meter may involve creating new definition files (e.g., table definition languages) for the smart meter. The table definition language files (TDLs) enable applications to read data being communicated from the smart meters. For example, the table definition language files act as an interpreter of data communicated between the smart meter to a variety of applications. Examples of applications that may require such table definition language files include systems operating under the IEC 61968 standard and/or meter reading and programming applications that utilized the Advance Metering Infrastructure (AMI). There are numerous meter types, each meter requiring its own TDL. Further, as modifications are made to the meters (e.g., firmware modifications), each meter may require additional TDLs reflecting the modifications made to the smart meter. Thus, the number of TDLs may be quite substantial. In many cases, creating these new definition files involves completely rewriting the definition files, which can be a very time consuming and costly process.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a meter management system includes storage configured to store a first table definition language that defines attributes of a meter. The storage is also configured to store a table definition language fragment configured to define modifications to the first table definition language. Data processing circuitry of the meter management system is configured to create a second table definition language based at least upon applying the modifications from the table definition language fragment to the first definition language.

In a second embodiment, a computer readable medium comprises instructions to interpret a table definition language fragment that includes modifications of attributes and functionalities defined in a first table definition language. The computer readable medium also includes instructions to generate a second table definition language with the subsequent modifications based at least upon applying the modifications in the table definition language fragment to the first table definition language.

In a third embodiment, a method includes generating a subsequent table definition language after a first table definition language has been generated. The method includes storing the first table definition language representative of attributes and functionalities of a meter. Further, the method includes applying a table definition language fragment. The table definition language includes modifications to the first table definition language. The method also includes generating the subsequent table definition language based at least partially on the first table definition language with the table definition language fragment applied.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a block diagram of an embodiment of an electrical distribution system that employs a meter reader utilizing table definition language files to communicate with smart meters;

FIG. 2 is a block diagram of an embodiment of a smart meter communicating with a meter reader by utilizing a table definition language file that corresponds to the configuration of the smart meter, in accordance with embodiments;

FIG. 3 is a block diagram of an embodiment of a schematic view of a meter management system that generates subsequent table definition language files by using table definition language fragments;

FIG. 4 is a block diagram of an embodiment of a meter reader with an onboard meter management system, enabled to generate subsequent table definition language files dynamically;

DETAILED DESCRIPTION OF THE INVENTION

Figure 6:
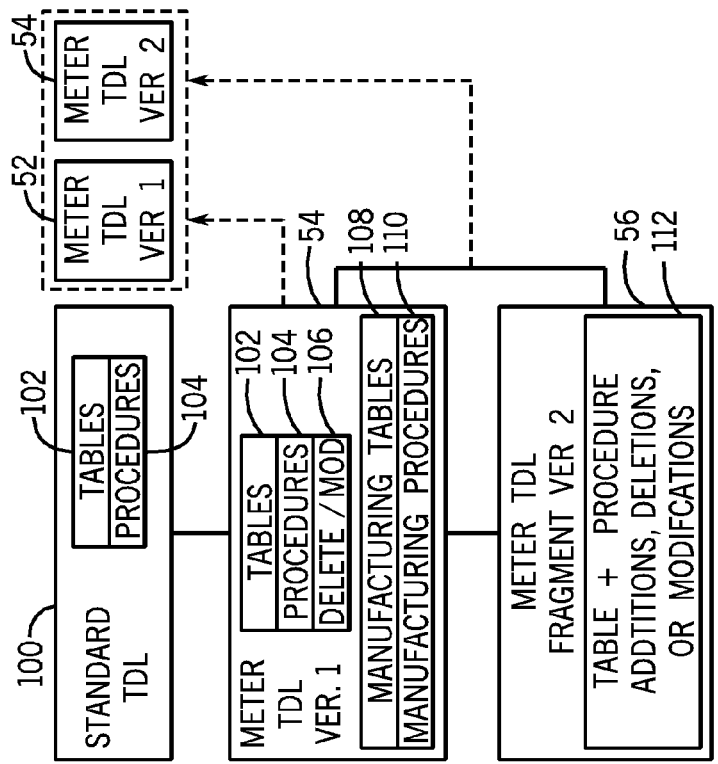
FIG. 6 is a schematic of an embodiment of table definition languages created through an inheritance process, in accordance with embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements.

Smart meters often times provide two-way communications between the meter and a utility providing electricity to the meter. These meters may include many data tables and functionalities that store various information to be communicated between the meter and the utility. Many manufacturers may desire to decrease the time, cost, and effort necessary for updating the attributes and functionalities of their smart meters. Embodiments of the present disclosure relate to systems and methods for generating subsequent definitions (e.g., table definition language files) without requiring the manufacturer to completely store or rewrite the smart meter definitions. In particular, the current application relates to a process of generating subsequent definition files (e.g., table definition languages) through inheritance from one or more prior definition files. By inheriting from prior definition files, the manufacturer may be enabled to provide only the changes to be implemented when desiring to create a subsequent definition file. Thus, the subsequent TDL generation process described herein may decrease the effort, cost, and time associated with creating these subsequent definition files.

With the foregoing in mind, FIG. 1 illustrates an embodiment of an electrical distribution system 10 controlled by a utility 12 employing a meter reader 14 with table definition language (TDL) files 15. TDLs allow applications receiving communications from the smart meters to understand the communication. As discussed in detail below, the disclosed embodiments as shown in FIG. 1, a power grid 16 may provide power to power consumers 20 (e.g., commercial or residential consumers) through smart meters 22.

The smart meters 22 may include many different functionalities. For example, the smart meters 22 may monitor the power demand, peaks, accumulated energy, and/or time of use by the power consumers 20. Further, the smart meters 22 may measure harmonics and/or disturbance. Additionally, the smart meters 22 may also include communication circuitry 24 that may communicate with communication circuitry 26 at the utility 12. To implement the functionalities, the smart meters 22 may include a variety of configurations 27 that define attributes and functionalities of the smart meters 22. The configurations 27 may be very complex, because they provide the internal data structures and code to support and implement the vast array of functionalities of the smart meters 22. Because the circuitry and functionalities of the individual smart meters 22 may vary, each smart meter 22 may include a configuration 27 specifically designed for the smart meter 22 type and version. To be enabled to interpret communications from the smart meter 22, the meter reader 14 may require an individual table definition language (TDL) file 15 corresponding to the configuration 27 of each smart meter 22.

For example, as illustrated in FIG. 2, smart meter 22 is enabled to communicate data 38 to the meter reader 14 through use of a specific configuration 27 (e.g., version 1.2). The meter reader 14 is provided a specific table definition language (TDL) 15 (e.g., version 1.2) that enables the meter reader to understand, parse, and interpret table data 38 that is being communicated to the meter reader 14. As previously discussed, a manufacturer may occasionally desire to change the configuration 27 of the smart meter 22. For example, the configuration 27 may be modified from an initial firmware version to a second firmware version. For each modification of the configuration 27, a new TDL 15 may be needed to enable the meter reader 14 to interpret the data 38 being communicated from the smart meter 22 to the meter reader 14. As discussed below, the disclosed embodiments enable a new TDL 15 to be generated without re-writing an entirely new TDL 15.

FIG. 3 illustrates an embodiment of a meter management system 50 that is enabled to generate subsequent table definition languages 52 from a previous TDL 54 and one or more TDL fragments 56 (e.g., modified or new information to modify the previous TDL 54). The meter management system 50 may include a processor 58, a display 59, memory 60 (e.g., random access memory), a graphical user interface 61 (e.g., a software interface, or web interface), storage 62 (e.g., a hard disc drive), and communications circuitry 64. The meter management system 50 may include instructions for the processor 58 to consume a TDL 54 and one or more TDL fragments 56 and store the TDL 54 and TDL fragments 56 in the storage 62. Further, the meter management system 50 may include instructions for the processor 58 to apply the TDL fragments 56 to the TDL 54. In certain embodiments, the processor 58 may interpret the TDL fragments 56 to obtain modifications, additions, and deletions for the TDL 54. The processor 58 may then make a copy of the TDL 54 and apply the interpreted modifications from the TDL fragments 56 to generate the new TDL 52. The TDL fragments 56 may modify any portion of the TDL 54, such as approximately 1 to 100, 5 to 75, 10 to 50, or 15 to 25 percent of the TDL 54. For example, the TDL fragments 56 may add new data, remove existing data, or change existing data by any suitable amount, e.g., greater than approximately 1, 5, 10, 15, 20 30, 40, 75, or 100 percent. In an alternative embodiment, the processor 58 may apply the TDL fragments 56 to the TDL 54 through inheritance. The TDL fragments 56 may inherit from the TDL 54, thus reusing the attributes defined in the TDL 54 that are not defined in the TDL fragments 56. In other words, the processor 58 may build a new TDL 52 starting with the TDL fragments 56 and any missing information found in the previous TDL 54. Items that are defined in the TDL fragments 56 may override any items in the TDL 54.

In certain embodiments, the meter management system 50 may be enabled to apply a plurality of TDL fragments 52, or inheritance chain (e.g., 56a, 56b, and 56c) to a TDL 54 to provide one or more subsequent TDLs 52. For example, when TDL fragment 56c is the last TDL fragment in a TDL fragment chain (e.g., latest version) the processor 58 may cause the last TDL fragment 56 (e.g., TDL fragment 56c) to inherit from the TDL 54 and the prior TDL fragments (e.g., TDL fragments 56a and 56b). Thus, a subsequent TDL 52 that incorporates the attributes from the prior TDL 54 and all of the modifications in the TDL fragments 56 may be generated.

The meter management system 50 may include processor 58 instructions to publish the subsequent TDLs 52 to a TDL repository 66 (e.g., a database) through the communications circuitry 64. For example, the communications circuitry 64 may include wireless or wired network communications that provides the subsequent TDLs 52 to the TDL repository 66. The TDL repository 66 may be a repository that is provided by the smart meter 22 manufacturer, or may be a common repository remote from an individual manufacturer that is shared by numerous manufacturers of devices that utilize table definition languages.

While the current embodiment illustrates the subsequent TDLs 52 being published to the repository 66 prior to use, in certain alternative embodiments, the subsequent TDLs 52 may be generated dynamically as an application (e.g., meter reader 14) receives a communication from the smart meter 22. For example, as illustrated in FIG. 4, the application (e.g., meter reader 14) may include the meter management system 50, such that subsequent TDLs 52 may be generated upon receiving table data 38 from the smart meter 22. In the illustrated embodiment, the smart meter 22 communicates table data 38 to the meter reader 14. To interpret the data, meter reader 14 generates a TDL for the smart meter 22 utilizing an onboard meter management system 50. The subsequent TDLs 52 may be generated from a base TDL 54 and TDL fragments 56 stored in an accessible storage location (e.g., storage 62 or repository 66). Upon generating the subsequent TDL 52, the meter reader 14 is able to utilize the generated subsequent TDL 52 to interpret the table data 32 received from the smart meter 22.

In some embodiments, the meter management system 50 may enable a simplified construction of TDL fragments 56. For example, in certain embodiments, the display 59 may provide the graphical user interface 61 to a user of the meter management system 50. The graphical user interface 61 may enable a simplified construction of TDL fragments 56 by enabling the user to provide one or more user inputs 68 that represent modifications that should be made for the subsequent TDL 52. Modifications may include additions, subtractions, or modifications to items in the TDL 54. The meter management system 50 may then construct the TDL fragment 56 based upon the user inputs 68.

Figure 5:
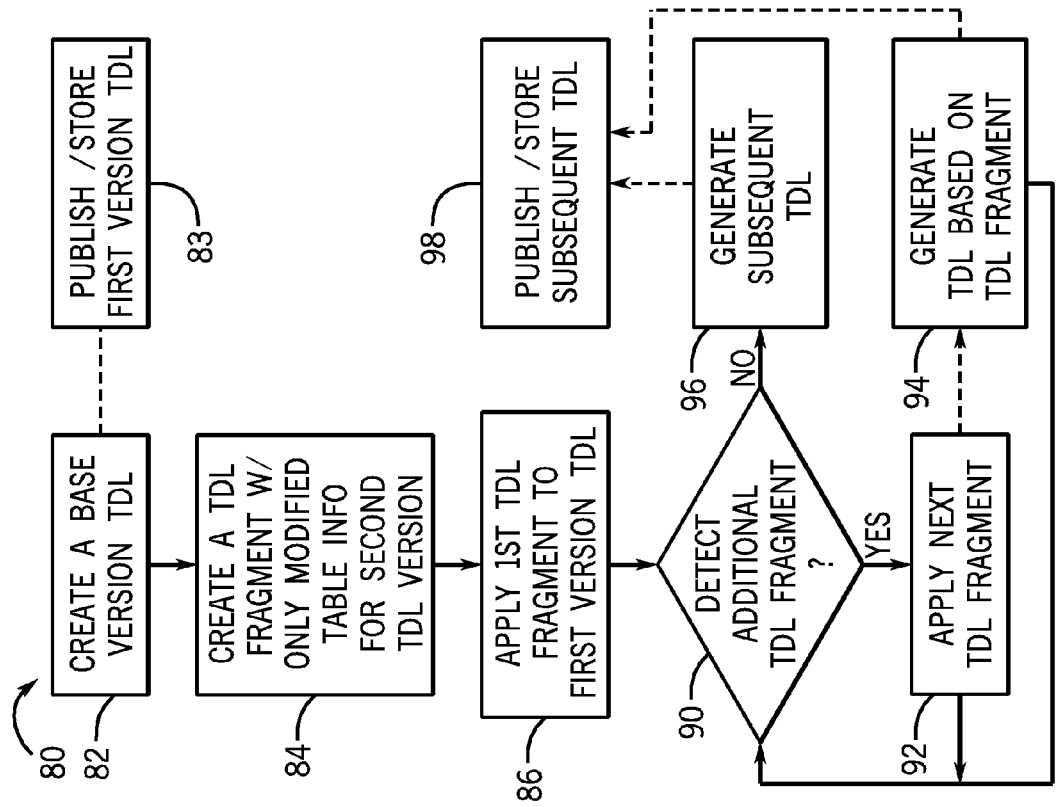
FIG. 5 is a flow chart of an embodiment of a process for generating a subsequent table definition language file.

FIG. 5 illustrates an embodiment of the subsequent TDL generation process 80. The manufacturer of smart meter 22 may create a base version TDL 54 (step 82). The base version TDL 52 may include a complete definition of the attributes necessary for interpretation of data provided from the smart meter 22. The base version TDL 52 may be optionally published to the repository 66 and/or stored (e.g., in storage 62) (step 83). When the smart meter 22 manufacturer desires to update the smart meter 22 with configuration 27 modifications, the manufacturer may incorporate TDL 54 modifications so that interpreting devices can still interpret the data 38 communicated from the smart meter 22. Thus, the manufacturer may create a TDL fragment 56 that defines the modifications desired between the previous TDL 54 and the subsequent or new TDL 52 (step 84). In some embodiments, a meter management tool may record modifications made from a copy of the base TDL 54 and generate the TDL fragment 56 from the recorded modifications. As previously discussed, the meter management system 50 may apply the TDL fragment 56 to the base TDL 54 (step 86). The meter management system 50 may poll to detect if additional TDL fragments 56 need to be applied (step 90). In embodiments where all TDL fragments 56 are to be applied to the base TDL 54, polling may include detecting the presence of any TDL fragments 56 that have not been applied. As will be discussed in more detail below, with regards to FIGS. 5 and 7, some embodiments may enable a user to select a TDL version to be generated, and generate the TDL version from a subset of TDL fragments 56. In embodiments where only a subset of TDL fragments 56 are to be applied, polling may include detecting the presence of any TDL fragments 56 in the subset that have not been applied. If additional TDL fragments 56 need to be applied, the next TDL fragment 56 is applied (step 92). The meter management system 50 may then generate a subsequent TDL 52 based upon the applied TDL fragment 56 (step 94), or may continue to detect and apply additional TDL fragments 56 without generating subsequent TDLs 52 until the resultant subsequent TDL 52 is ready to be generated (e.g. until no more TDL fragments are detected) (step 96). After the subsequent TDLs 52 are generated, they may be optionally published to the repository 66 or stored (e.g., in storage 62) (step 98).

FIG. 6 illustrates a more detailed view of the structure and relationship between the base TDL 54 and the TDL fragments 56. The base TDL 54 is created from a TDL standard 100. For example, one such standard is the ANSI C12.19-TDL standard that provides that all smart meter 22 structure be captured in tables and procedures. The TDL standard 100 provides a definition and structure as to how the TDLs (e.g., 52 and 54) are to be constructed. The TDL standard 100 may include a plurality of standard tables 102 and standard procedures 104. The base TDL 54 may inherit from the TDL standard 100, thus obtaining the standard tables 102 and the standard procedures 104 from the base TDL 100. The manufacturer may include in the base TDL 54 modifications 106 including value changes, additions, and/or deletions to the standard tables 100 and/or the standard procedures 104. Additionally, the manufacturer may include additional manufacturing tables 108 and/or manufacturing procedures 110 created for the specific device (e.g., smart meter 22). The manufacturing tables 108 and manufacturing procedures 110 enable the manufacturer to create meter specific data in addition to the data stored in the standard tables 102 and standard procedures 104. After creating a base TDL 54, the base TDL 54 may be published to the repository 66. As previously mentioned, as changes are performed on the meter, (e.g., updating firmware of the meter from version 1 to version 2), tables and procedures stored on the smart meter 22 may be modified. In accordance with the disclosed embodiments, the manufacturer is not required to manually create an entire subsequent TDL 52 to create an interpreter for devices (e.g., meter reader 14) that communicate with the smart meter 22. Instead, the manufacturer may create the TDL fragments 56, that describe the modifications 112 between the base TDL 54 and the subsequent TDL 52 (e.g., due to upgrading the firmware from version 1 to version 2).

Figure 7:
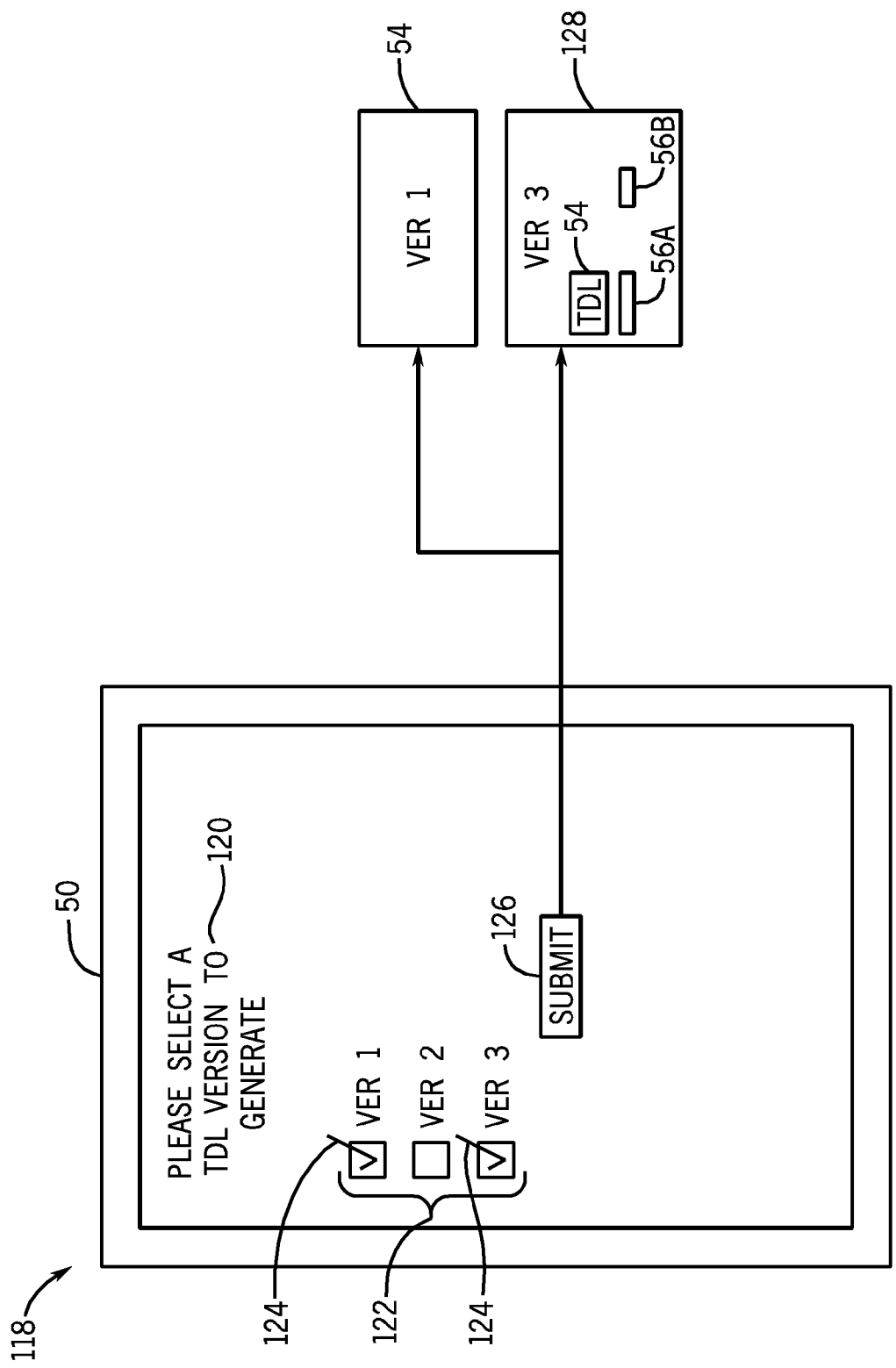
FIG. 7 is a schematic of an embodiment of a graphical user interface of a subsequent table definition language screen.

FIG. 7 illustrates a graphical user interface 118 to enable a user to define a specific TDL version to generate. The graphical user interface 118 may be included in the meter management system 50, or may be in a separate computer system (e.g., a desktop or laptop computer). The graphical user interface 118 may include a user prompt 120 requesting that a user select a specific TDL version to generate. For example, the user may be provided with checkboxes 122 or other inputs (e.g. radio buttons, text boxes, drop down menus, buttons, etc.) to select one or more TDL versions to generate. In the illustrated embodiment, the user has selected versions 1 and 3 to be generated. The user may submit a request by clicking a submit button 126. The meter management system 50 may interpret the request for TDL versions to be generated (e.g., the request that versions 1 and 3 be generated). Upon interpreting the request, the meter management system 50 may determine the TDL fragments 56 that are associated with the requested versions. For example, version 1 may be associated with the base TDL 54 and not with any associated TDL fragments 56. Further, version 3 may be associated with the modifications in TDL fragments 56A and 56B. The meter management system 50 may provide the base TDL 54 without applying any TDL fragments 56, thus rendering the version 1 TDL 54. Further, when version 3 is requested, the meter management system 50 may apply TDL fragments 56A and 56B to the base TDL 54 and provide the version 3 TDL 128.

Technical effects of the invention include providing a process for creating subsequent table definition languages (TDLs) for smart meters without requiring a manufacturer to store or rewrite an entire secondary table definition language file. The secondary table definition language files may inherit from a previous table definition language file and thus the manufacturer can simply store and rewrite the modifications to the previous table definition language file, to generate a subsequent table definition language file. Additionally, a manufacturer is able to generate a multitude of TDL versions based on applying a subset of TDL fragments. The TDLs may be stored or published to a repository.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A meter management system, comprising:
   a storage device configured to store a first table definition language configured to define attributes of an electrical utility meter and to store a table definition language fragment, comprising attributes, functionalities, or both to be modified in the first table definition language, to create a second table definition language; and
   a processor configured to create the second table definition language based at least upon applying attributes, functionalities, or both of the first table definition language that are not found in the table definition language fragment to the attributes, functionalities, or both from the table definition language fragment without altering the first table definition language;
   wherein the second table definition language is created at a time before a desired modification is to be applied from the second table definition language to an electrical utility meter.

2. The meter management system of claim 1, wherein the first table definition language inherits from a C12.19-TDL standard.

3. The meter management system of claim 1, comprising a meter management tool configured to record the modifications to the first table definition language and create the table definition language fragment based on the recorded modifications.

4. The meter management system of claim 1, wherein the processor is configured to apply the modifications from the table definition language fragment to the first table definition language through inheritance from the first table definition language.

5. The meter management system of claim 1, wherein the first table definition language comprises manufacturing tables configured to enable a manufacturer to create an additional set of data, additional tables, or both, that are not part of a standard set of data, standard tables, or both.

6. The meter management system of claim 5, wherein the modifications comprise addition, a change, or a deletion relating to the manufacturing tables.

7. The meter management system of claim 1, comprising a central repository configured to store a plurality of table definition languages.

8. The meter management system of claim 7, wherein the processor is configured to publish the first and second table definition languages to the central repository.

9. The meter management system of claim 1, wherein the processor is configured to publish the first and second table definition languages to a non-vendor specific repository.

10. A non-transitory computer readable medium, comprising instructions:
    to interpret a table definition language fragment, wherein the table definition fragment comprises attributes, functionalities, or both that differ from attributes, functionalities, or both defined in a first table definition language, to define a second table definition language; and
    to generate the second table definition language with the subsequent modifications based at least upon applying attributes, functionalities, or both in the first table definition language that are not in the attributes, functionalities, or both in the table definition language fragment to the attributes, functionalities, or both of the table definition language fragment, without altering the first table definition language;
    wherein the second table definition language is generated at a time before a desired modification is to be applied from the second table definition language to an electrical utility meter.

11. The non-transitory computer readable medium of claim 10, comprising instructions to:
    provide a graphical user interface for constructing the table definition language fragment;
    receive a user input at the graphical user interface; and
    construct the table definition language fragment based upon the user input.

12. The non-transitory computer readable medium of claim 10, comprising instructions to store and/or publish the second table definition language.

13. The non-transitory computer readable medium of claim 10 comprising instructions to interpret a request for the second table definition language, and instructions to generate the second table definition language based on the request.

14. A computer-implemented method, comprising:
    storing a first table definition language comprising attributes, functionalities, or both of an electrical utility meter; and
    obtaining a table definition language fragment, wherein the table definition language fragment comprises attributes, functionalities, or both to be modified in the first table definition language to create a subsequent table definition language; and
    generating the subsequent table definition language based at least partially on the first table definition language and the modifications in the table definition language fragment, by applying attributes, functionalities, or both of the first table definition language that are not in the table definition language fragment to the attributes, functionalities, or both of the table definition language fragment, without altering the first table definition language;
    wherein the subsequent table definition language is generated at a time before a desired modification is to be applied from the subsequent table definition language to the electrical utility meter.

15. The computer-implemented method of claim 14, wherein storing the first table definition language comprises storing the attributes and functionalities of the electrical utility meter representative of an initial firmware version, and obtaining the table definition language fragment comprises obtaining a table definition fragment comprising modifications of the initial firmware version for a second firmware version.

16. The computer-implemented method of claim 14, comprising generating the subsequent table definition language at a time when ready for a desired modification to be applied from the subsequent table definition language to the electrical utility meter.

17. The computer-implemented method of claim 16, comprising generating the subsequent table definition language by applying an inheritance chain, comprising a plurality of table definition language fragments to the first table definition language.

18. The computer-implemented method of claim 17, comprising generating a specific version of the subsequent table definition language by applying a subset of the plurality of table definition language fragments associated with the specific version.

19. The computer-implemented method of claim 14, comprising generating a third table definition language at the time by applying a second table definition language fragment, comprising attributes, functionalities, or both to be modified in the subsequent table definition language to generate the third table definition language, to the generated subsequent table definition language.

* * * * *